United States Patent
Endo et al.

(10) Patent No.: US 6,682,277 B2
(45) Date of Patent: Jan. 27, 2004

(54) TOOL, TOOL HOLDER, AND MACHINE TOOL

(75) Inventors: Katsuhito Endo, Shizuoka (JP); Sakashi Adachi, Shizuoka (JP); Takazumi Watanabe, Shizuoka (JP); Yoshiaki Kai, Shizuoka (JP); Yasufumi Kawago, Shizuoka (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/268,932

(22) Filed: Oct. 11, 2002

(65) Prior Publication Data

US 2003/0072631 A1 Apr. 17, 2003

(30) Foreign Application Priority Data

Oct. 16, 2001 (JP) ............................ 2001-318393
Nov. 12, 2001 (JP) ............................ 2001-345727
Nov. 19, 2001 (JP) ............................ 2001-353172

(51) Int. Cl.$^7$ .................................................. B23Q 3/12
(52) U.S. Cl. .................. 409/231; 409/234; 408/124
(58) Field of Search ........................ 409/231, 234, 409/230; 408/124

(56) References Cited

U.S. PATENT DOCUMENTS 3,586,403 A * 6/1971 Cooley ...................... 384/481
3,752,595 A   8/1973 Woythal et al.

(List continued on next page.)

FOREIGN PATENT DOCUMENTS

| GB | 2 014 332 | 8/1979 | ................ 409/193 |
| JP | 63-109941 | 5/1988 | ................ 409/231 |
| JP | 2001341045 A | * 12/2001 | ............ B23Q/5/10 |
| JP | 2001347435 A | * 12/2001 | ............ B23Q/5/04 |
| JP | 2002059331 A | * 2/2002 | ............ B23Q/5/10 |

OTHER PUBLICATIONS

U.S. patent application Ser. No. 10/268,987, Kato, filed Oct. 11, 2002.
U.S. patent application Ser. No. 10/305,079, Watanabe, filed Nov. 27, 2002.
U.S. patent application Ser. No. 10/305,132, Katsumata et al., filed Nov. 27, 2002.
U.S. patent application Ser. No. 10/197,267, Katoh et al., filed Jul. 18, 2002.
U.S. patent application Ser. No. 10/270,248, Adachi et al., filed Oct. 15, 2002.

*Primary Examiner*—A. L. Wellington
*Assistant Examiner*—Dana Ross
(74) *Attorney, Agent, or Firm*—Pillsbury Winthrop LLP

(57) ABSTRACT

A tool attachable to a spindle of a machine tool by an automatic tool changer in the same way as an ordinary tool, capable of being driven without connecting with an external power supply etc., and able to rotate at a rotational speed different from that of the spindle of the machine tool without supply of electric power from the outside, provided with a machining tool for machining a workpiece, a motor connected with the machining tool, and a generator to which rotary force is transmitted from the spindle of the machine tool and generating electric power to drive the motor, sealed bearings sealed with a lubricating oil are used for the bearings rotatably supporting a transmitting member for transmitting rotary force of the spindle to the generator and a drive shaft for transmitting rotary force generated by the motor to the machining tool.

16 Claims, 5 Drawing Sheets

U.S. PATENT DOCUMENTS

| | | | |
|---|---|---|---|
| 4,077,736 A | | 3/1978 | Hutchens |
| 4,519,734 A | * | 5/1985 | Mitchell et al. ............ 409/231 |
| 4,534,686 A | * | 8/1985 | Nakamura et al. .......... 409/135 |
| 4,692,074 A | * | 9/1987 | Smith et al. ................ 409/233 |
| 4,716,657 A | | 1/1988 | Collingwood |
| 4,741,650 A | | 5/1988 | Nakata |
| 4,789,280 A | * | 12/1988 | Dobat et al. ................ 409/233 |
| 4,805,404 A | | 2/1989 | Dupin |
| 5,100,271 A | * | 3/1992 | Kameyama et al. ........ 409/231 |
| 5,290,130 A | * | 3/1994 | Beretta ...................... 409/131 |
| 5,564,872 A | | 10/1996 | Veil et al. |
| 5,636,949 A | | 6/1997 | Nakamura et al. |
| 5,697,739 A | | 12/1997 | Lewis et al. |
| 5,759,000 A | * | 6/1998 | Wawrzyniak et al. ....... 409/231 |
| 5,921,731 A | * | 7/1999 | Chandrasekar .............. 409/231 |
| 6,102,636 A | * | 8/2000 | Geise ......................... 409/231 |
| 6,394,717 B1 | * | 5/2002 | Mazaki et al. .............. 409/132 |
| 6,416,450 B2 | * | 7/2002 | Susnjara ...................... 483/47 |
| 6,474,913 B2 | * | 11/2002 | Katoh et al. ................ 409/131 |
| 2001/0049325 A1 | | 12/2001 | Katoh et al. |

* cited by examiner

TOOL, TOOL HOLDER, AND MACHINE TOOL

BACKGROUND OF THE INVENTION

1. Field of the Invention

The present invention relates to a tool to be attached to a spindle of a machine tool for machining a workpiece.

2. Description of the Related Art

In, for example, a machining center or other machine tool provided with a spindle, the maximum rotational speed of the spindle (per unit time) is determined by the structure of a the main bearing rotatably supporting the spindle and a its lubrication system. For this reason, when desiring to rotate a tool at a speed higher than the maximum rotational speed of the spindle, an accelerating apparatus is used.

An example of a known accelerating apparatus holds the tool and is able to be attached to the spindle. The accelerating apparatus increases the rotary force of the spindle by a gear mechanism, such as epicyclic gearing, to increase the rotational speed of the tool.

For example, in a machining center, when it is desired to increase the rotational speed of the tool to higher than the maximum speed of the spindle temporarily, such an accelerating apparatus is attached to the spindle in the same way as an ordinary tool to enable the tool to be rotated at a higher rotational speed.

However, when raising the rotational speed of the tool to a higher speed than the spindle by the above accelerating apparatus comprised of the gear mechanism, the accelerating apparatus increasingly generates heat at a super high rotational speed, e.g., tens of thousands to hundreds of thousands of revolutions per minute, such that the machining tolerance of a workpiece can be influenced by the heat. Furthermore, at the above super high rotational speed, the noise from the accelerating apparatus can also increase. Accordingly, a highly reliable, precise structure, able to withstand the above super high rotational speed, is required for the accelerating apparatus. A disadvantage to such a structure is that the manufacturing cost becomes relatively high.

In an accelerating apparatus with a gear mechanism, it is necessary to lubricate the gear or bearing using a supply passage and a discharge passage for lubricating oil in the accelerating apparatus. A disadvantage to such a lubrication system is that the apparatus becomes larger and it is more difficult to automatically change the tool by an automatic tool changer.

Another accelerating method is using a high frequency motor for driving the tool, and supplying drive current to this high frequency motor from a specially provided control apparatus so as to rotate the tool at a high speed. However, since there is a cable for supplying electric power externally, there are the disadvantages that it is difficult to automatically change tools, and the cost of the facilities is increased.

SUMMARY OF THE INVENTION

An object of the present invention is to provide a tool and a tool holder attachable to a spindle of a machine tool by an automatic tool changer in the same manner as an ordinary tool, capable of giving a higher rotational speed than the speed of the spindle of the machine tool without the supply of electric power externally. The tool and tool holder are capable of operating without connection to an external power supply, and they are made compact to be changed automatically.

Another object of the present invention is to provide a machine tool including the above tool and tool holder.

According to a first embodiment of the present invention, there is provided a tool attachable to a spindle of a machine tool including a machining tool for machining a workpiece; a motor for driving the machining tool; and a generator electrically coupled to said motor to which rotary force is transmitted from a spindle of the machine tool and thereby generating electric power to drive the motor and; sealed bearings including a lubricating oil rotatably supporting a transmitting member for transmitting rotary force of the spindle to the generator, and a drive shaft for transmitting rotary force generated by the motor to the machining tool.

The tool can further include an attachment part serving as the transmitting member attachable to the spindle and transmitting rotary force of the spindle to the motor, and a case for rotatably holding the attachment part and a drive shaft of the motor through the bearings and engaging with a non-rotating portion of the machine tool so as to be restricted from rotation.

The generator can be an alternating current generator which supplies voltage of a frequency in accordance with the rotational speed of the spindle to the motor, and the motor can be an induction motor rotating by the rotational speed in accordance with a frequency.

According to a second embodiment of the present invention, there is provided a tool holder able to hold a machining tool for machining a workpiece and attachable to a spindle of a machine tool, including a tool holding part for rotatably holding the machining tool; a motor for rotating the tool holding part; and a generator electrically coupled to the motor, to which rotary force is transmitted from a spindle of the machine tool and generating electric power to drive the motor; and sealed bearings including a lubricating oil rotatably supporting a transmitting member for transmitting rotary force of the spindle to the generator, and a drive shaft for transmitting rotary force generated by the motor to the machining tool.

The tool holder can further include an attachment part serving as the transmitting member attachable to the spindle and transmitting rotary force of the spindle to the motor, and a case for rotatably holding the attachment part and a drive shaft of the motor through the bearings and engaging with a non-rotating portion of the machine tool so as to be restricted from rotation.

The generator can be an alternating current generator which supplies voltage of a frequency in accordance with the rotational speed of the spindle to the motor, and the motor can be an induction motor rotating by the rotational speed in accordance with a frequency.

According to a third embodiment of the present invention, there is provided a machine tool including a machine tool body provided with a spindle, a drive means for driving the spindle, and at least one control axis for changing a relative position between the spindle and a workpiece; a tool, attachable to the spindle, and provided with a machining tool for machining a workpiece, a motor for driving the machining tool, and a generator, electrically coupled to the motor, to which rotary force is transmitted from the spindle and thereby generating electric power for driving the motor; a control apparatus for controlling the drive of the drive means and the control axis in accordance with a machining program; and in the tool, sealed bearings including a lubricating oil rotatably supporting a transmitting member for transmitting rotary force of the spindle to the generator, and a drive shaft for transmitting rotary force generated by the motor to the machining tool.

The machine tool can further include an automatic tool changer for attaching the tool to the spindle.

According to a fourth embodiment of the present invention, there is provided a tool attachable to a spindle of a machine tool including a machining tool for machining a workpiece; a motor for driving the machining tool; a generator, electrically coupled to the motor, for generating electric power to drive the motor; an attachment part for transmitting rotary force to the generator from the spindle and to be attached to the spindle; a casing for holding the motor and the generator, rotatably holding the attachment part, and forming a cooling groove for circulating a coolant for cooling the motor and the generator; and a locking part provided at the casing, engaging with a non-rotating part near the spindle for restricting rotation, and formed with a hole for supplying the coolant from the non-rotating part; the tool supplying coolant from the locking part to the tool and circulating the coolant to the cooling groove so as to cool the tool itself and cool the generator and motor.

The casing can circulate the coolant to the cooling groove, then discharge it from an end of the cooling groove to the outside of the tool.

According to a fifth embodiment of the present invention, there is provided a tool holder able to hold a machining tool for machining a workpiece and attachable to a spindle of a machine tool body, including a tool holding part for rotatably holding the machining tool; a motor for rotating the tool holding part; a generator, electrically coupled to the motor, for generating electric power for driving the motor; a casing for holding the motor and the generator, and forming a cooling groove for circulating a coolant for cooling the motor and the generator; and a locking part provided at the casing, engaging with a non-rotating part near the spindle for restricting rotation, and formed with a hole for supplying the coolant from the non-rotating part; the tool supplying coolant from the locking part to the tool and circulating the coolant to the cooling groove so as to cool the tool holder itself and cool the generator and motor.

According to a sixth embodiment of the present invention, there is provided a machine tool including a machine tool body provided with a spindle, a drive means for driving the spindle, and at least one control axis for changing a relative position between the spindle and a workpiece; a tool to be attached to the spindle; and a control apparatus for controlling the drive of the drive means and the control axis in accordance with a machining program; wherein the tool is provided with a machining tool for machining a workpiece, a motor for driving the machining tool, a generator, electrically coupled to the motor, for generating electric power to drive the motor, and a cooling means for cooling the tool itself and cooling the motor and the generator.

According to a seventh embodiment of the present invention, there is provided a tool to be attached to a spindle of a machine tool, comprising a machining tool for machining a workpiece; a motor for driving the machining tool; a generator, electrically coupled to the motor, for generating electric power to drive the motor; an attachment part having a first channel for carrying a cooling medium for cooling the tool and a second channel formed from the middle of the first channel at an outer diameter side near the generator and connected to the first channel, transmitting rotary force to the generator from the spindle, and to be attached to the spindle; a casing having a third channel for carrying a coolant provided so as to connect a space at the generator side and a space at the motor side and continuing from the second channel, holding the motor and the generator, and rotatably holding the attachment part; and a locking part provided at the casing and engaging with a non-rotating part near the spindle for restricting rotation.

The casing can circulate the coolant to the tool, then discharge it from a front end of the casing to the outside of the tool.

According to an eighth embodiment of the present invention, there is provided a tool holder able to hold a machining tool for machining a workpiece and attachable to a spindle of a machine tool body, including a tool holding part for rotatably holding the machining tool; a motor for rotating the tool holding part; a generator, electrically coupled to the motor, for generating electric power for driving the motor; an attachment part having a first channel for carrying a cooling medium for cooling the tool holder and a second channel formed from the middle of the first channel at an outer diameter side near the generator and connected to the first channel, transmitting rotary force to the generator from the spindle, and to be attached to the spindle; a casing having a third channel for carrying a coolant provided so as to connect a space at the generator side and a space at the motor side and continuing from the second channel, holding the motor and the generator, and rotatably holding the attachment part; and a locking part provided at the casing and engaging with a non-rotating part near the spindle for restricting rotation.

According to a ninth embodiment of the present invention, there is provided a machine tool including a machine tool body provided with a spindle, a drive means for driving the spindle, and at least one control axis for changing a relative position between the spindle and a workpiece; a tool to be attached to the spindle; and a control apparatus for controlling the drive of the drive means and the control axis in accordance with a machining program; wherein the tool is provided with a machining tool for machining a workpiece, a motor for driving the machining tool, a generator, electrically coupled to the motor, for generating electric power to drive the motor, and a cooling means having a channel for carrying a coolant from a rear center of an attachment part from the spindle side, cooling the tool itself, and cooling the motor and the generator.

In the first to third embodiments of the present invention, a tool to be attached to the spindle is provided with a generator electrically coupled to a motor, electric power is generated using the rotary force of the spindle, and the generated electric power is used to drive the motor and rotate the machining tool. Accordingly, it is possible to drive the tool without connection with an external power source, and automatic tool changing is facilitated.

Thus, the tool of the disclosed embodiments is completely independent from the spindle and any external device. If the bearings used for the disclosed tool are lubricated by supplying lubricant from the spindle or otherwise externally, a supply passage and a discharge passage for the lubricant become necessary, sacrificing the complete independence of the tool from the spindle and external devices, requiring a tool larger in size.

Therefore, in the disclosed embodiments, by using sealed bearings not requiring replenishment of lubricant at the rotating part of the tool, the tool can be completely independent from external apparatuses and can be made more compactly.

In the fourth to sixth embodiments of the present invention, a tool to be attached to the spindle is provided with a generator, electrically coupled to a motor, electric power is generated using the rotary force of the spindle, and the generated electric power is used to drive the motor and rotate the machining tool. Accordingly, it is possible to drive the tool without connection with an external power source, and automatic tool changing is facilitated.

Furthermore, the tool of the disclosed embodiments carries a coolant in the cooling groove provided in the tool for cooling the tool itself and the generator and motor, suppressing heat expansion and deterioration of machining tolerances.

In the seventh to ninth embodiments of the present invention, a tool to be attached to the spindle is provided with a generator, electrically coupled to a motor, electric power is generated using the rotary force of the spindle, and the generated electric power is used to drive the motor and rotate the machining tool. Accordingly, it is possible to drive the tool without connection with an external power source, and automatic tool changing is facilitated.

Furthermore, the tool of the disclosed embodiments carries a coolant from the center of the tool for cooling the tool itself and the generator and motor, suppressing heat expansion and deterioration of machining tolerances.

BRIEF DESCRIPTION OF THE DRAWINGS

These and other objects and features of the disclosed embodiments will be more apparent from the following description of the disclosed embodiments given in relation to the accompanying drawings, wherein.

DESCRIPTION OF THE PREFERRED EMBODIMENTS

Figure 1:
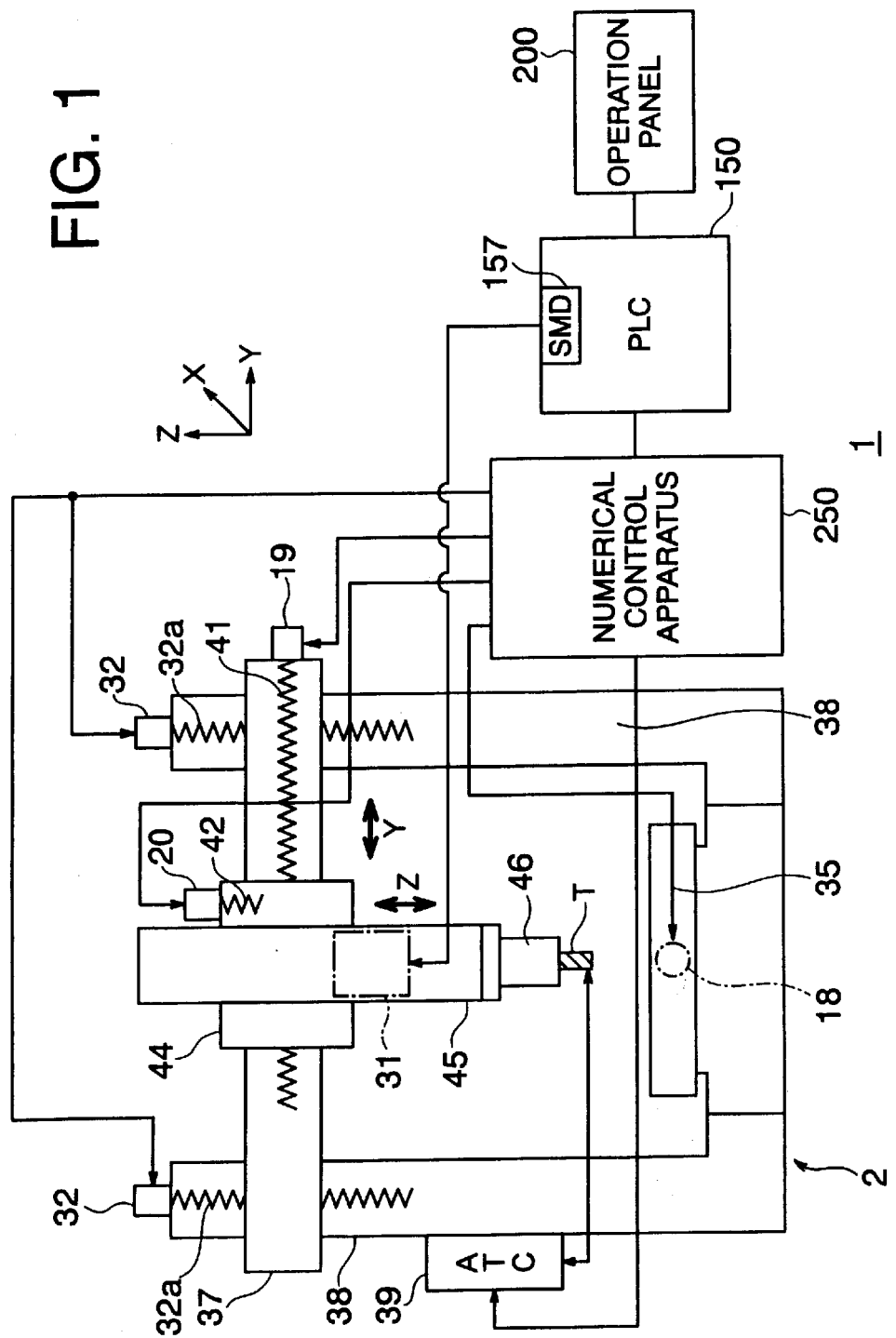
FIG. 1 is a view of the configuration of a machining center as an example of a machine tool to which the disclosed embodiments are applied.

Below, an explanation will be made of embodiments of the present invention by referring to the drawings.

First Embodiment

FIG. 1 is a view of the configuration of a machining center as an example of a machine tool according to the disclosed embodiments. Note that the machining center is a numerical control machine tool capable of so-called combined machining.

The machining center 1 is provided with a machine tool body 2, a numerical control apparatus (NC apparatus) 250, and a programmable logic controller (PLC) 150.

In FIG. 1, the machine tool body 2 is provided with a cross rail 37 having two ends movably supported by shafts of a double housing type column 38. A ram 45 is provided movably in a vertical direction (Z-axis direction) via a saddle 44 supported movably on this cross rail 37.

The saddle 44 is provided with a nut part (not illustrated) passing through the cross rail 37 in a horizontal direction. A feed shaft 41 with a screw part formed on the outer circumference is screwed into this nut part.

A servo motor 19 is connected with an end of the feed shaft 41. The feed shaft 41 is driven to rotate by the servo motor 19.

By the rotation of the feed shaft 41, the saddle 44 moves in the Y-axis direction. By this, the ram 45 is moved and positioned in the Y-axis direction.

Further, the saddle 44 is provided with a nut part (not illustrated) oriented in the vertical direction. The feed shaft 42 with a screw part formed on the outer circumference is screwed into this nut part. A servo motor 20 is connected with an end of the shaft 42.

The servo motor 20 rotates the feed shaft 42. By this, the ram 45 movably provided on the saddle 44 is moved and positioned in the Z-axis direction.

The ram 45 has built into it a spindle motor 31. This spindle motor 31 rotates a spindle 46 rotatably supported by the ram 45. At the front end of the spindle 46 a tool T is provided, comprised of an end mill or other machining tool and a tool holder for holding this machining tool. The tool T is driven by the rotation of the spindle 46.

Below the ram 45, a table 35 on which a workpiece to be worked is fixed, is provided movably in the X-axis direction. The table 35 is provided with a nut part (not illustrated). A nut feed shaft (not illustrated) provided along the X-axis direction is screwed into this nut part. The feed shaft (not illustrated) is connected to the servo motor 18.

The table 35 is moved and positioned in the X-axis direction by the rotation and driving of the servo motor 18.

Further, the double housing column 38 is provided with a nut part (not illustrated). The cross rail 37 is raised and lowered by the rotation of the feed shaft 32a screwed into it by a cross rail elevation servo motor 32.

An automatic tool changer (ATC) 39 automatically changes the tool T attached to the spindle 46.

That is, the automatic tool changer 39 stores, in a magazine (not illustrated), tools T comprised of end mills, drills, and various other machining tools held by tool holders. The automatic tool changer 39 returns a tool T, attached to the spindle 46 by a tool changing arm (not illustrated), into the magazine, and attaches a required tool T to the spindle 46 by the tool changing arm.

The NC apparatus 250 drives and controls the above servo motors 18, 19, and 20 and the cross rail elevation servo motor 32.

The NC apparatus 250 controls the positions and the speeds between a workpiece and the tool T by the servo motors 18, 19, 20 and 32 according to a machining routine defined in advance in by a machining program. Further, the NC apparatus 250 controls the rotational speed of the spindle 46 by decoding the rotational speed (rotational speed per unit time) of the spindle 46 defined by an S-code in the machining program.

Still further, the NC apparatus 250 automatically changes various tools by decoding the tool changing operation of the tool T defined by, for example, an M-code in the NC program.

The PLC 150 is connected to the NC apparatus 250 and the operational panel 200. The PLC 150 performs various kinds of sequence control, for example, starting and stopping the machining center 1 in accordance with a predetermined sequence program, outputting signals to switch on and off the display part of the operational panel 200, etc.

Further, the PLC 150 is connected to a spindle motor driver (SMD) 157 to drive and control the spindle motor 31. The PLC 150 outputs control commands, to start and stop the spindle motor 31 and control its speed, to the spindle motor driver 157.

Figure 2:
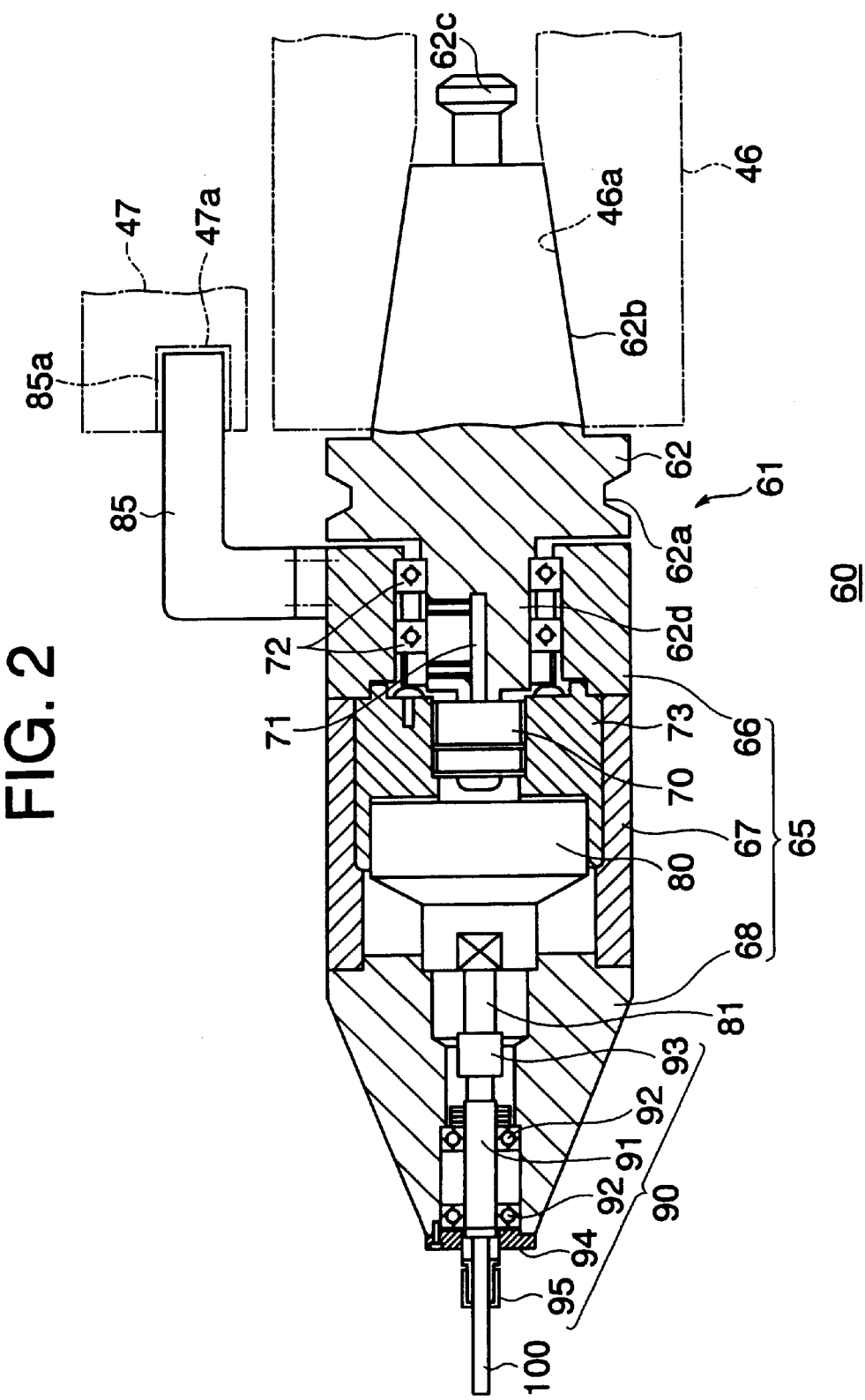
FIG. 2 is a sectional view of the configuration of a tool according to a first embodiment of the present invention.

FIG. 2 is a sectional view of a tool according to the first embodiment of the present invention.

In FIG. 2, a tool 60 is comprised of a cutting tool 100 and a tool holder 61 for holding the cutting tool 100. Note that the cutting tool 100 is one embodiment of a machining tool. Further, the tool 60 according to the present embodiment is attached to the spindle 46 by the automatic tool changer 39 in the same way as the above ordinary tool T.

The tool holder 61 has an attachment part 62, a casing 65 comprised of casing parts 66, 67, and 68, a generator 70, a motor 80, a tool holding part 90, and a locking part 85.

The attachment part 62 is provided with a grip 62a, a taper shank 62b to be attached to a taper sleeve 46a formed at the front end of the above spindle 46, a pull stud 62c formed at the front end of this taper shank 62b, and a shaft 62d rotatably held by the casing part 66.

The grip 62a of the attachment part 62 is gripped by the above tool changing arm of the automatic tool changer 39 when the tool 60 is being attached to the spindle 46 from the magazine of the automatic tool changer 39 and when the tool 60 is being conveyed from the spindle to the magazine of the automatic tool changer 39.

The center of the taper shank 62b of the attachment part 62 becomes concentric with the center of the spindle 46 by being attached to the taper sleeve 46a of the spindle 46.

The pull stud 62c of the attachment part 62 is clamped by a collet of a clamping mechanism (not illustrated) built in the spindle 46 when the attachment part 62 is attached to the taper sleeve 46a of the spindle 46. Note that the clamping mechanism built in the spindle 46 is well known, so a detailed explanation will be omitted.

The shaft 62d of the attachment part 62 is supported and rotatably held by the inner circumference of the casing part 66 via a plurality of bearings 72. A sealed ball bearing can be used as the bearing 72.

The generator 70 and the motor 80 are held by the inner circumference of the casing part 67 via a holding part 73.

The input shaft 71 of the generator 70 is connected concentrically with the shaft 62d of the attachment part 62. The generator 70 receives the rotary force of the spindle 46 transmitted through the attachment part 62.

As the generator 70, for example, a three-phase synchronous generator can be used.

The motor 80 is supplied with electric power generated by the generator 70 through conductor cables (not shown). The motor 80 is driven by the electric power supplied from the generator 70. As the motor 80, for example, a three-phase induction motor can be used.

The tool holding part 90 has a shaft 91, a coupling 93 for connecting this shaft 91 and the output shaft 81 of the motor 80, and a tool attachment part 95 fastened to the front end of the shaft 91. Note that the shaft 91 and the shaft 81 are embodiments of the drive shaft of the present invention.

The shaft 81 is rotatably held by a bearing (not shown). The bearing (not shown) supporting the shaft 81 of the motor 80 is also one of the bearings of the disclosed embodiments. Further, as the bearing, as mentioned later, a sealed angular ball bearing can be used.

The shaft 91 is rotatably held by the inner circumference of the casing part 68 via a plurality of bearings 92. As the bearings 92, sealed angular ball bearings can be used.

The shaft 91 is stopped by a stopper 94 at the front end side of the casing part 68.

The cutting tool 100 is held by the tool attachment part 95. This cutting tool 100 machines a workpiece. Note that the tool attachment part 95 is an embodiment of the tool holding part according to the disclosed embodiments. Specifically, as the cutting tool 100, a cutting tool such as a drill or an end mill may be used. As another machining tool, a polisher, grindstone, etc. may be used.

The casing parts 66, 67, and 68 are connected to each other by fastening means such as bolts. The casing 65 is constructed by casing parts 66, 67, and 68.

The locking part 85 is mounted on the outer circumference of the casing part 66.

When the attachment part 62 is attached to the taper sleeve 46a of the spindle 46, the front end of the locking part 85 is inserted to an engagement hole 47a formed at a non-rotating part such as the ram 45 or the spindle 46.

Accordingly, even if the spindle 46 is rotated, rotation of the casing part 66, i.e., the casing 65, is prevented.

Sealed angular ball bearings may be used as the bearing 72 of the shaft 62d, the bearing 92 of the shaft 91, and the bearing of the shaft 81 of the motor 80.

The above-mentioned sealed angular ball bearings are special parts. In general, however, sealed ball bearings are called "cap bearings" in the JIS (Japan Industrial Standard) and ISO (International Standards Organization). Shield types, non-contact seal types, and contact seal types of bearings are known.

Figure 3:
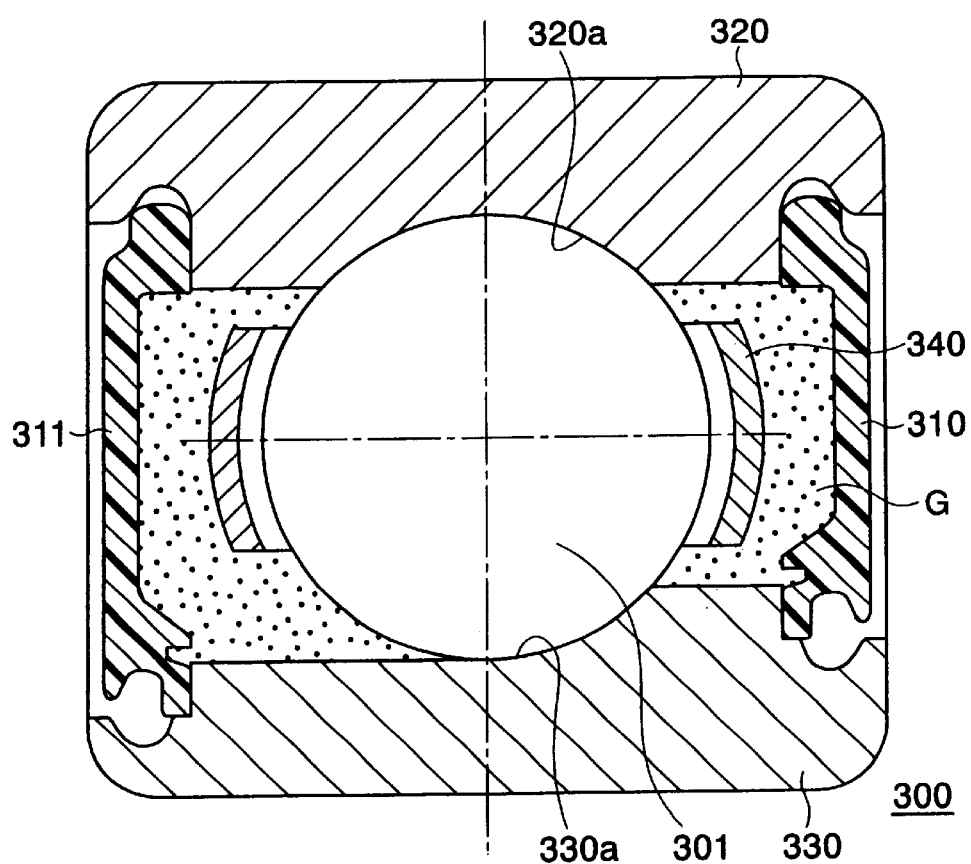
FIG. 3 is a sectional view of an example of a sealed angular ball bearing.

The sealed angular ball bearing 300 shown in FIG. 3 is a contact seal type.

In FIG. 3, the plurality of balls 301 serving as rolling bodies are arranged by the holder 340 so as not to contact each other, and the balls 301 are arranged between the raceway groove 330a of the inner ring 330 and the raceway groove 320a of the outer ring 320. Ring-shaped seal members 310 and 311 are provided at the two side surfaces of the inner ring 330 and outer ring 320.

Grease G is filled in the space sealed by the seal members 310 and 311.

The grease G used is, for example, preferably a grease having as small a frictional force as possible, is distributed evenly in the bearing over a long time even at the time of high speed rotation, and featuring little frictional loss. Specifically, grease of the brand Alkanol L75 made by FAG etc. may be used.

Next, an explanation will be made of an example of the operation of the tool 60 of the present embodiment.

First, the automatic tool changer 39 attaches the tool holder 60 holding the cutting tool 100 at the tool attachment part 95 to the spindle 46 of the machining center 1. The front end 85a of the locking part 85 is inserted into the engagement hole 47a of the non-rotating part 47 whereby the rotation of the casing 65 is prevented.

By rotating the spindle 46 at the rotational speed No from this state, the attachment part 62 of the tool 60 is rotated and the rotary force of the spindle 46 is transmitted to the generator 70. By this, the generator 70 can generate three-phase alternating current, in the case of using a three-phase synchronous generator.

The frequency f of the three-phase alternating current generated by the generator 70 is expressed by the following formula (1) where the number of poles of the generator 70 is $P_1$ and the rotational speed of the spindle 46 is $N_O$ [min$^{-1}$]:

$$f = P_1 \times N_O / 120 [Hz] \quad (1)$$

Accordingly, when the spindle 46 is rotated at the rotational speed $N_O$, a three-phase alternating current having the frequency f expressed the above formula (1) is supplied to the motor 80.

When a three-phase induction motor is used as the motor 80, if the number of poles of the motor 80 is $P_2$, the motor 80 is rotated by $2/P_2$ per cycle of the three-phase alternating current. Therefore, the synchronous rotational speed $N_1$ of the three-phase induction motor at the time of no slippage is expressed by the following formula (2):

$$N_1=120\times f/P_2 [\text{min}^{-1}] \quad (2)$$

Accordingly, the relationship of the rotational speed $N_1$ of the tool 60 to the rotational speed $N_0$ of the spindle 46 is expressed by the following formula (3):

$$N_1=N_0\times P_1/P_2 [\text{min}^{-1}] \quad (3)$$

As understood from formula (3), the rotational speed No of the spindle 46 is changed to the rotational speed N, expressed by the above formula (3).

As expressed by the formula (3), it is found that by appropriately setting the ratio between the number of poles $P_1$ of the three-phase synchronous generator and the number of poles $P_2$ of the three-phase induction motor, it is possible to freely set the ratio of the rotational speed $N_1$ of the tool 60 to the rotational speed No of the spindle 46.

That is, when trying to raise the speed over the rotational speed $N_o$ of the spindle 46, the ratio of the number of poles $P_1/P_2$ is set larger than 1. When trying to lower it, it is sufficient to select the number of poles $P_1$ of the three-phase synchronous generator and the number of poles $P_2$ of the three-phase induction motor so that the ratio $P_1 P_2$ becomes smaller than 1.

For example, when the maximum rotational speed Nmax of the spindle 46 is 3,000 $\text{min}^{-1}$, if machining a workpiece using an ordinary tool, the maximum rotational speed of the spindle 46 is often sufficient.

In contrast, when using a machining center 1 having a maximum rotational speed Nmax of the spindle 46 of 3,000 $\text{min}^{-1}$ and desiring to perform high speed machining using for example an aluminum alloy for the workpiece, sometimes it is desired to increase the rotational speed of the tool 60 to 30,000 $\text{min}^{-1}$.

For this purpose, a particular tool 60 is stored in the magazine of the automatic tool changer 39 of the machining center 1. This tool includes a three-phase synchronous generator and three-phase induction motor having a ratio $P_1/P_2$ of numbers of poles equal to 10, so as to give a 10-fold increase in rotational speed.

The automatic tool changer 39 automatically attaches the tool 60 to the spindle 46 in the same way as an ordinary tool.

The spindle 46 is rotated by operating the spindle motor 31. The rotational speed of the cutting tool 100 held by the tool 60 is controlled by the rotational speed of the spindle 46. Specifically, in the NC program downloaded at the NC apparatus 250, the rotational speed of the spindle 46 is designated by an S-code so as to define the rotational speed of the cutting tool 100 of the tool 60.

For example, when rotating the cutting tool 100 of the tool 60 at a rotational speed of 30,000 $\text{min}^{-1}$, the rotational speed of the spindle 46 is designated as 3000 $\text{min}^{-1}$ by the S-code in the NC program.

When the spindle 46 is rotated at the rotational speed of 3,000 $\text{min}^{-1}$, the generator 70 generates a three-phase alternating current having a frequency in accordance with the rotational speed of the spindle 46 and the number of poles $P_1$.

The motor 80 is driven by the three-phase alternating current supplied from the generator 70, while the cutting tool 100 of the tool 60 is rotated at the rotational speed of about 30,000 $\text{min}^{-1}$.

In the above state where the rotational speed of the cutting tool 100 is increased, the workpiece is cut by moving the workpiece, fixed on the table 35, relative to the cutting tool 100 (spindle 46) in accordance with the machining program.

Due to this, for example when using a machining center 1 where the maximum rotational speed of the spindle 46 is limited, high speed machining of the workpiece is enabled by rotating the cutting tool 100 at a rotational speed over the maximum rotational speed of the spindle 46.

In this way, according to the present embodiment, the rotational speed of the tool 60 is raised over that of the spindle 46 by incorporating the generator 70 coupled to motor 80 in the tool holder 61 formed as a unit in the same way as an ordinary tool, driving the motor 80 by the electric power generated by the generator 70. Accordingly, even if rotating the spindle 46 at a high speed, increased heat is not generated compared to a gear driven apparatus, heat expansion of the tool 60 is suppressed, and machining tolerances are maintained.

Further, according to the present embodiment, it is possible to make the inertia of the motor 80 smaller than the inertia of the spindle 46. Therefore, it is possible to improve the response of the cutting tool 100 compared with directly rotating the spindle 46 at a high rotational speed.

Further, according to the present embodiment, a tool 60, increased in rotational speed compared with the spindle 46, can be attached to the spindle 46 and be changed by the automatic tool changer 39 in the same way as an ordinary tool. Therefore, it is possible to immediately respond to a request for machining at a higher speed while machining at an ordinary rotational speed.

Further, according to the present embodiment, the cutting tool 100 is driven by the electric power generated by the rotation of the spindle 46. Therefore, it is not necessary to supply a driving current externally. As a result, a cable for supplying electric power is not needed.

Further, according to the present embodiment, by using sealed angular ball bearings for the bearings used in the tool 60, there is no need to supply lubricating oil from outside of the tool 60 and there is no need to provide a passage for supplying or discharging the lubricating oil. Therefore, the tool 60 can be made more compact. As a result, the tool 60 is suitable for automatic changing by the automatic tool changer 39.

Second Embodiment

Figure 4:
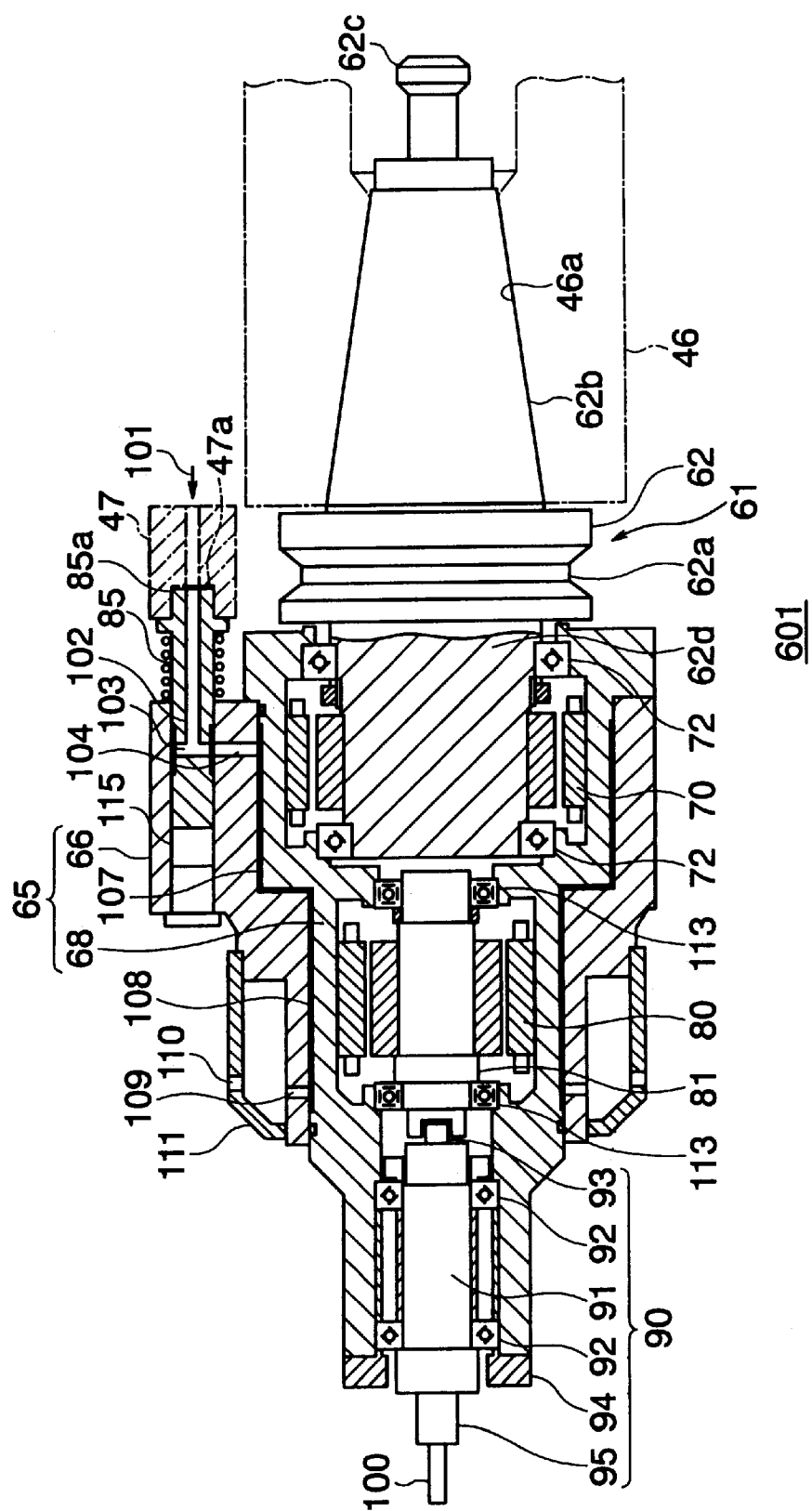
FIG. 4 is a sectional view of the configuration of a tool according to a second embodiment of the present invention.

FIG. 4 is a sectional view of the configuration of an embodiment of a tool of the present invention.

In FIG. 4, the tool 601 includes a cutting tool 100 and a tool holder 61 holding the cutting tool 100. Note that the cutting tool 100 is one embodiment of a machining tool. Further, the tool 601 according to the present embodiment is able to be attached to the spindle 46 by an automatic tool changer 39 in the same way as an ordinary tool T.

The tool holder 61 is provided with an attachment part 62, a casing 65 comprised of casing parts 66 and 68, a generator 70, a motor 80, a tool holder 90, and a locking part 85.

The attachment part 62 is provided with a grip 62a, a taper shank 62b to be attached to a taper sleeve 46a formed at the front end of the above spindle 46, a pull stud 62c formed at the front end of this taper shank 62b, and a shaft 62d rotatably held in the casing part 66.

The grip 62a of the attachment part 62 is gripped by the above tool changing arm of the automatic tool changer 39 when the tool 601 is being attached to the spindle 46 from the magazine of the automatic tool changer 39, and when the tool 601 is being conveyed from the spindle to the magazine of the automatic tool changer 39.

The center of the taper shank 62b of the attachment part 62 becomes concentric with the center of the spindle 46 by being attached to the taper sleeve 46a of the spindle 46.

The pull stud 62c of the attachment part 62 is clamped by a collet of a clamping mechanism (not illustrated) built in the spindle 46 when the attachment part 62 is attached to the taper sleeve 46a of the spindle 46. Note that the clamping mechanism built in the spindle 46 is well known, so a detailed explanation will be omitted.

The shaft 62d of the attachment part 62 is rotatably held at the inner circumference of the casing part 66 through a plurality of bearings 72. An angular ball bearing can be used as the bearing 72.

The generator 70, motor 80, and tool holding part 90 are held at the inner circumference of the casing part 68. At the outer circumference of the casing part 68 near the generator 70 and the stator of the motor 68, cooling grooves 107 and 108 are formed, serving as cooling means. These cooling grooves 107 and 108 are connected continuously.

The front end of the cooling groove 108 is formed with a discharge hole 109 connected to the cooling groove 108 and opening to the inside of the cover 111.

The cover 111 is configured so as to be attached to the front end of the casing part 66. A discharge hole 110 is open from the inside of the cover 111 to the atmosphere side.

The generator 70 is connected concentrically with the shaft 62d of the attachment part 62. The rotary force of the spindle 46 is transmitted to the generator 70 through the attachment part 62.

As the generator 70, for example, a three-phase synchronous generator can be used.

The motor 80 is driven by the electric power supplied from the generator 70. As the motor 80, for example, a three-phase induction motor may be used.

The tool holder 90 is provided with a shaft 91, a coupling 93 connecting the shaft 91 and a shaft 81 of the motor 80, and a tool attachment part 95 fastened to the front end of the shaft 91. Note that the shaft 91 and the shaft 81 are embodiments of the drive shaft.

The shaft 81 of the motor 80 is rotatably held by the bearing 113. As this bearing, a sealed ball bearing may be used.

The shaft 91 is rotatably held at the inner circumference of the casing part 68 through a plurality of bearings 92. As the bearings 92, angular ball bearings may be used.

The front end of the shaft 91 is locked at the casing part 68 by the locking part 94.

The cutting tool 100 is held by the tool attachment part 95. This cutting tool 100 machines the workpiece. Note that the tool attachment part 95 is one embodiment of the tool holder. The cutting tool 100 includes various types of tools such as drills and end mills.

The casing parts 66 and 68 are connected by, for example, bolts or other fastening means. These casing parts 66 and 68 form a casing 65.

The casing part 66 is formed with a guide 115 guiding a locking part 85 in a freely movable manner, and further holds the casing part 68.

Further, the casing part 66 is connectable to a channel 103 formed at the locking part 85 by being formed with a channel 104 made in the center direction of the tool 601 and being connected to a cooling groove 107 of the casing part 68.

The front end 85a of the locking part 85 is inserted into an engagement hole 47a formed in, for example, the ram 45 or other non-rotating part 47 of the spindle 46 side by the attachment of the attachment part 62 to the taper sleeve 46a of the spindle 46.

Accordingly, the casing part 66, that is, the casing 65, is restricted from rotation even when the spindle 46 is rotating.

The center of the locking part 85 is formed with a channel 102 in the axial center direction. The channel 85 at the side where the locking part 85 sticks out is open. The guide 115 side is connected with a channel 103 formed perpendicularly with the axial center direction. Further, the channel 103 is connected to the channel 104 formed at the casing part 66 side.

Coolant 101 flows from the non$^{-1}$ rotating part 47 through the channels 102 and 103 of the engaged locking part 85, passes through the channel 104 of the casing part 66, flows through the cooling groove 107 formed at the outside of the casing part 68, and cools the outside of the generator 70.

The coolant 101 passing through the cooling groove 107 flows through the cooling groove 108 to cool the stator side of the motor 80.

Further, after cooling, the coolant 101 passes through the discharge hole 109, is discharged to the cover 111, and then is discharged to the atmosphere from the discharge hole 109.

Third Embodiment

Figure 5:
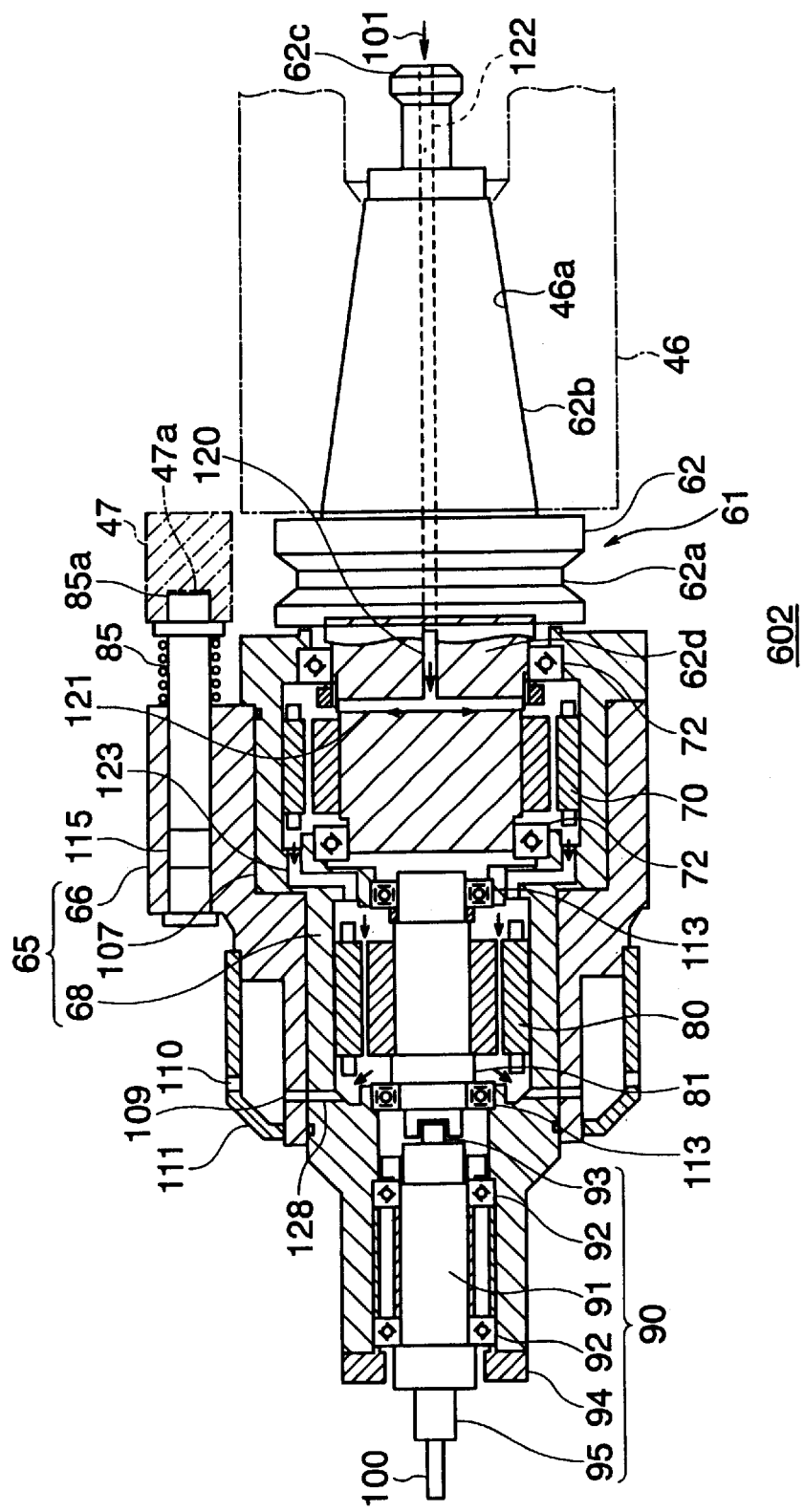
FIG. 5 is a sectional view of the configuration of a tool according to a second embodiment of the present invention.

FIG. 5 is a sectional view of the configuration of a tool according to a third embodiment of the present invention. Note that parts the same as the tool according to the second embodiment are assigned the same reference numerals.

In the tool 602 according to the present embodiment, a channel 120 is formed at the center of the taper shank 62b of the attachment part 62. The channel 120 is connected with a channel 121 formed in a direction perpendicular to the axial center of the shaft 62d near the generator 70. The channel 121 is formed between the generator 70 and the bearing 72. A coolant 101, such as air, is passed in the clearance between the rotating side and fixed side of the generator 70 for cooling.

The bearing 72 of the casing part 68 at the generator 70 side is formed with a channel 123 so as to connect the space at the generator 70 side and the space at the motor 80 side. The coolant 101 is circulated through the channel 123.

Further, at the cutting tool 100 side of the casing part 68 is provided a discharge hole 128 for discharging the coolant 101.

The front end of the casing part 66 at the cutting tool 100 side is formed with a discharge hole 109 connected to the discharge hole 128 and opening to the inside of the cover 111.

Coolant 101 flows from the spindle 46 by the pull stud 62c through the channel 120 formed at the center of the attachment part 62. It passes through the channel 121 formed in a direction perpendicular to the axial center of the shaft 62d near the generator 70, flows through the clearance between the rotating side and fixed side of the generator 70, and cools the generator 70.

The coolant 101 cools the generator 70, then passes through the channel 123 and flows to the motor 80 side. Further, it flows through the clearance between the rotating side and fixed side of the motor 80 to cool the motor 80.

Further, the coolant 101 passes through the discharge holes 128 and 109 to be exhausted to the cover 111 and then is exhausted to the atmosphere from an exhaust hole 110 of the cover 111.

As explained above, according to the present embodiment, the rotational speed of the tool 602 is raised over that of the spindle 46 by incorporating the generator 70 and motor 80 in the tool holder 61 formed as a unit in the same way as an ordinary tool and driving the motor 80 by the electric power generated by the generator 70. Accordingly, even if rotating the spindle 46 at a high speed, increased heat is not generated compared to a gear driven apparatus, heat expansion of the tool 602 is suppressed, and machining tolerances are maintained.

While the disclosed embodiments have been described with reference to specific embodiments chosen for purpose of illustration, it should be apparent that numerous modifications could be made thereto by those skilled in the art without departing from the basic concept and scope of the invention.

What is claimed is:

1. A tool attachable to a spindle of a machine tool comprising:

a machining tool for machining a workpiece;

a motor for driving said machining tool;

a generator, electrically coupled to said motor, to which rotary force is transmitted from a spindle of said machine tool and thereby generating electric power to drive said motor; and sealed bearings including a lubricating oil rotatably supporting a transmitting member for transmitting rotary force of said spindle to said generators, and a drive shaft for transmitting rotary force generated by said motor to said machining tool.

2. A tool as set forth in claim 1, further comprising:

an attachment part serving as said transmitting member attachable to said spindle and transmitting rotary force of said spindle to said motor, and a case for rotatably holding said attachment part and a drive shaft of said motor through said bearings and engaging with a non-rotating portion of said machine tool so as to be restricted from rotation.

3. A tool as set forth in claim 1 or 2, wherein:

said generator is an alternating current generator which supplies voltage of a frequency in accordance with rotational speed of said spindle to the motor; and said motor is an induction motor rotating by said rotational speed in accordance with a frequency.

4. A tool holder able to hold a machining tool for machining a workpiece and attachable to a spindle of a machine tool, comprising:

a tool holding part for rotatably holding said machining tool;

a motor for rotating said tool holding part; and a generator, electrically coupled to said motor, to which rotary force is transmitted from a spindle of said machine tool and generating electric power to drive said motor; and sealed bearings including a lubricating oil rotatably supporting a transmitting member for transmitting rotary force of said spindle to said generator, and a drive shaft for transmitting rotary force generated by said motor to said machining tool.

5. A tool holder as set forth in claim 4, further comprising:

an attachment part serving as said transmitting member attachable to said spindle and transmitting rotary force of said spindle to said motor; and a case for rotatably holding said attachment part and a drive shaft of said motor through said bearings and engaging with a non-rotating portion of said machine tool so as to be restricted from rotation.

6. A tool holder as set forth in claim 4 or 5, wherein:

said generator is an alternating current generator which supplies voltage of a frequency in accordance with the rotational speed of said spindle to the motor; and said motor is an induction motor rotating by said rotational speed in accordance with a frequency.

7. A machine tool comprising:

a machine tool body provided with a spindle, a drive means for driving said spindle, and at least one control axis for changing a relative position between said spindle and a workpiece;

a tool, attachable to said spindle, and provided with a machining tool for machining a workpiece, a motor for driving said machining tool, and a generator, electrically coupled to said motor, to which rotary force is transmitted from said spindle and thereby generating electric power for driving said motor;

a control apparatus for controlling a drive of said drive means and said control axis in accordance with a machining program; and in said tool, sealed bearings including a lubricating oil rotatably supporting a transmitting member for transmitting rotary force of said spindle to said generator, and a drive shaft for transmitting rotary force generated by said motor to said machining tool.

8. A machine tool as set forth in claim 7, further comprising an automatic tool changer for attaching said tool to said spindle.

9. A tool attachable to a spindle of a machine tool comprising:

a machining tool for machining a workpiece;

a motor for driving said machining tool;

a generator, electrically coupled to said motor, for generating electric power to drive said motor;

an attachment part for transmitting rotary force to said generator from said spindle and to be attached to said spindle;

a casing for holding said motor and said generator, rotatably holding said attachment part, and forming a cooling groove for circulating a coolant for cooling said motor and said generator; and a locking part provided at the casing, engaging with a non-rotating part near said spindle for restricting rotation, and formed with a hole for supplying said coolant from said non-rotating part;

the tool supplying coolant from said locking part to said tool and circulating the coolant to said cooling groove so as to cool the tool itself and cool the generator and motor.

10. A tool as set forth in claim 9, wherein said casing is a casing circulating said coolant to said cooling groove, then discharging it from an end of the cooling groove to an outside of said tool.

11. A tool holder able to hold a machining tool for machining a workpiece and attachable to a spindle of a machine tool body, comprising:

a tool holding part for rotatably holding said machining tool;

a motor for rotating said tool holding part;

a generator, electrically coupled to said motor, for generating electric power for driving said motor;

a casing for holding said motor and said generator, and forming a cooling groove for circulating a coolant for cooling said motor and said generator; and a locking part provided at the casing, engaging with a non-rotating part near said spindle for restricting rotation, and formed with a hole for supplying said coolant from said non-rotating part;

the tool supplying coolant from said locking part to said tool and circulating the coolant to said cooling groove so as to cool the tool holder itself and cool the generator and motor.

12. A machine tool comprising:

a machine tool body provided with a spindle, a drive means for driving said spindle, and at least one control axis for changing a relative position between said spindle and a workpiece;

a tool to be attached to said spindle; and a control apparatus for controlling a drive of said drive means and said control axis in accordance with a machining program; wherein said tool is provided with a machining tool for machining a workpiece, a motor for driving said machining tool, a generator, electrically coupled to said motor, for generating electric power to drive said motor, and a cooling means for cooling the tool itself and cooling said motor and said generator.

13. A tool to be attached to a spindle of a machine tool, comprising:

a machining tool for machining a workpiece;

a motor for driving said machining tool;

a generator, electrically coupled to said motor, for generating electric power to drive said motor;

an attachment part having a first channel for carrying a cooling medium for cooling the tool and a second channel formed from a middle of said first channel at an outer diameter side near said generator and connected to said first channel, transmitting rotary force to said generator from said spindle, and to be attached to said spindle;

a casing having a third channel for carrying a coolant provided so as to connect a space at a generator side and a space at a motor side and continuing from said second channel, holding said motor and said generator, and rotatably holding said attachment part; and a locking part provided at the casing and engaging with a non-rotating part near said spindle for restricting rotation.

14. A tool as set forth in claim 13, wherein said casing is a casing circulating said coolant to said tool, then discharging it from a front end of the casing to an outside of said tool.

15. A tool holder able to hold a machining tool for machining a workpiece and attachable to a spindle of a machine tool body, comprising:

a tool holding part for rotatably holding said machining tool;

a motor for rotating said tool holding part;

a generator, electrically coupled to said motor, for generating electric power for driving said motor;

an attachment part having a first channel for carrying a cooling medium for cooling the tool holder and a second channel formed from a middle of said first channel at an outer diameter side near said generator and connected to said first channel, transmitting rotary force to said generator from said spindle, and to be attached to said spindle;

a casing having a third channel for carrying a coolant provided so as to connect a space at a generator side and a space at a motor side and continuing from said second channel, holding said motor and said generator, and rotatably holding said attachment part; and a locking part provided at the casing and engaging with a non-rotating part near said spindle for restricting rotation.

16. A machine tool comprising:

a machine tool body provided with a spindle, a drive means for driving said spindle, and at least one control axis for changing a relative position between said spindle and a workpiece;

a tool to be attached to said spindle; and a control apparatus for controlling a drive of said drive means and said control axis in accordance with a machining program; wherein said tool is provided with a machining tool for machining a workpiece, a motor for driving said machining tool, a generator, electrically coupled to said motor, for generating electric power to drive said motor, and a cooling means having a channel for carrying a coolant from a rear center of an attachment part from a spindle side, cooling the tool itself, and cooling said motor and said generator.

* * * * *